United States Patent
Logan

(10) Patent No.: US 8,348,218 B2
(45) Date of Patent: Jan. 8, 2013

(54) COMPRESSOR MOUNTING STRUCTURE AND ASSEMBLY METHOD

(75) Inventor: Kent E. Logan, Clayton, OH (US)

(73) Assignee: Emerson Climate Technologies, Inc., Sidney, OH (US)

(*) Notice: Subject to any disclaimer, the term of this patent is extended or adjusted under 35 U.S.C. 154(b) by 280 days.

(21) Appl. No.: 12/612,232

(22) Filed: Nov. 4, 2009

(65) Prior Publication Data

US 2010/0108854 A1 May 6, 2010

Related U.S. Application Data

(60) Provisional application No. 61/111,582, filed on Nov. 5, 2008.

(51) Int. Cl.
*F16M 1/00* (2006.01)
*F04B 17/00* (2006.01)
*F25D 19/00* (2006.01)

(52) U.S. Cl. .......... 248/638; 248/678; 417/363; 62/295

(58) Field of Classification Search .......... 248/632–635, 248/677, 678, 638, 188.8, 188.9; 62/295, 62/296, 297; 310/51, 91; 411/24, 361; 267/136; 417/363

See application file for complete search history.

(56) References Cited

U.S. PATENT DOCUMENTS

| | | | | |
|---|---|---|---|---|
| 3,052,435 A | * | 9/1962 | Roller | 248/569 |
| 3,668,966 A | * | 6/1972 | Kincaid | 411/24 |
| 3,785,167 A | * | 1/1974 | Sahs | 62/296 |
| 5,040,953 A | * | 8/1991 | Tinsler | 248/638 |
| 5,052,903 A | | 10/1991 | Takahashi | |
| 5,125,778 A | * | 6/1992 | Sadri | 411/361 |
| 5,221,192 A | * | 6/1993 | Heflin et al. | 417/363 |
| 5,306,121 A | * | 4/1994 | Heflin et al. | 417/363 |
| 5,964,579 A | * | 10/1999 | Tang et al. | 417/363 |
| 6,029,942 A | * | 2/2000 | Daddis et al. | 248/635 |
| 6,467,990 B1 | | 10/2002 | Kremsler et al. | |
| 6,912,866 B2 | * | 7/2005 | Seo et al. | 62/295 |
| 7,208,853 B2 | * | 4/2007 | Terrill et al. | 310/51 |
| 7,814,760 B2 | * | 10/2010 | Immel et al. | 62/295 |
| 2001/0029651 A1 | * | 10/2001 | Fulbright | 29/243.522 |
| 2005/0201848 A1 | | 9/2005 | Reilly | |
| 2007/0085248 A1 | | 4/2007 | Chang | |

* cited by examiner

*Primary Examiner* — Tan Le
(74) *Attorney, Agent, or Firm* — Harness, Dickey & Pierce, P.L.C.

(57) ABSTRACT

A compressor assembly may include a hermetic shell, a base and a mounting assembly. The hermetic shell may include a lower cover defining a first aperture. The base may define a second aperture. The mounting assembly may include a first isolation member and a fastener. The first isolation member may define a third aperture and may be located on a first side of the base. The third aperture may have a first portion defining a first inner diameter. The fastener may extend through the first, second and third apertures. The fastener may include a shank having a first radial protrusion defining a first outer diameter greater than the first inner diameter.

20 Claims, 5 Drawing Sheets

COMPRESSOR MOUNTING STRUCTURE AND ASSEMBLY METHOD

CROSS-REFERENCE TO RELATED APPLICATIONS

This application claims the benefit of U.S. Provisional Application No. 61/111,582, filed on Nov. 5, 2008. The entire disclosure of the above application is incorporated herein by reference.

FIELD

The present disclosure relates to compressor mounting structures and methods of assembly.

BACKGROUND

This section provides background information related to the present disclosure which is not necessarily prior art.

Compressor assemblies may include mounting assemblies for coupling the compressor assembly to a mounting structure. The mounting assemblies may include fasteners and isolation members that must be positioned relative to the compressor assembly and mounting structure to couple the compressor assembly to the mounting structure. The mounting assemblies may require the different components of the compressor assembly to be shipped as separate components and may additionally require significant assembly times during installation.

SUMMARY

This section provides a general summary of the disclosure, and is not a comprehensive disclosure of its full scope or all of its features.

A compressor assembly may include a hermetic shell, a base and a mounting assembly. The hermetic shell may include a lower cover defining a first aperture. The base may define a second aperture. The mounting assembly may include a first isolation member and a fastener. The first isolation member may define a third aperture and may be located on a first side of the base. The third aperture may have a first portion defining a first inner diameter. The fastener may extend through the first, second and third apertures. The fastener may include a shank having a first radial protrusion defining a first outer diameter greater than the first inner diameter.

In an alternate arrangement, a compressor assembly may include a hermetic shell, a base and a mounting assembly. The hermetic shell may include a lower cover defining a first aperture. The base may define a second aperture. The mounting assembly may include a first isolation member, a second isolation member and a fastener. The first isolation member may define a third aperture and may be located between the lower cover and a first side of the base. The third aperture may have a first portion defining a first inner diameter. The second isolation member may define a fourth aperture that may be located adjacent to a second side of the base opposite the first side. The fourth aperture may have a first portion defining a second inner diameter. The fastener may extend through the first, second, third and fourth apertures. The fastener may include a shank having first and second radial protrusions spaced from one another. The first radial protrusion may define a first outer diameter greater than the first inner diameter and the second radial protrusion may define a second outer diameter greater than the second inner diameter.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The present teachings are suitable for incorporation in many different types of scroll and rotary compressors, including hermetic machines, open drive machines and non-hermetic machines.

Figure 1:
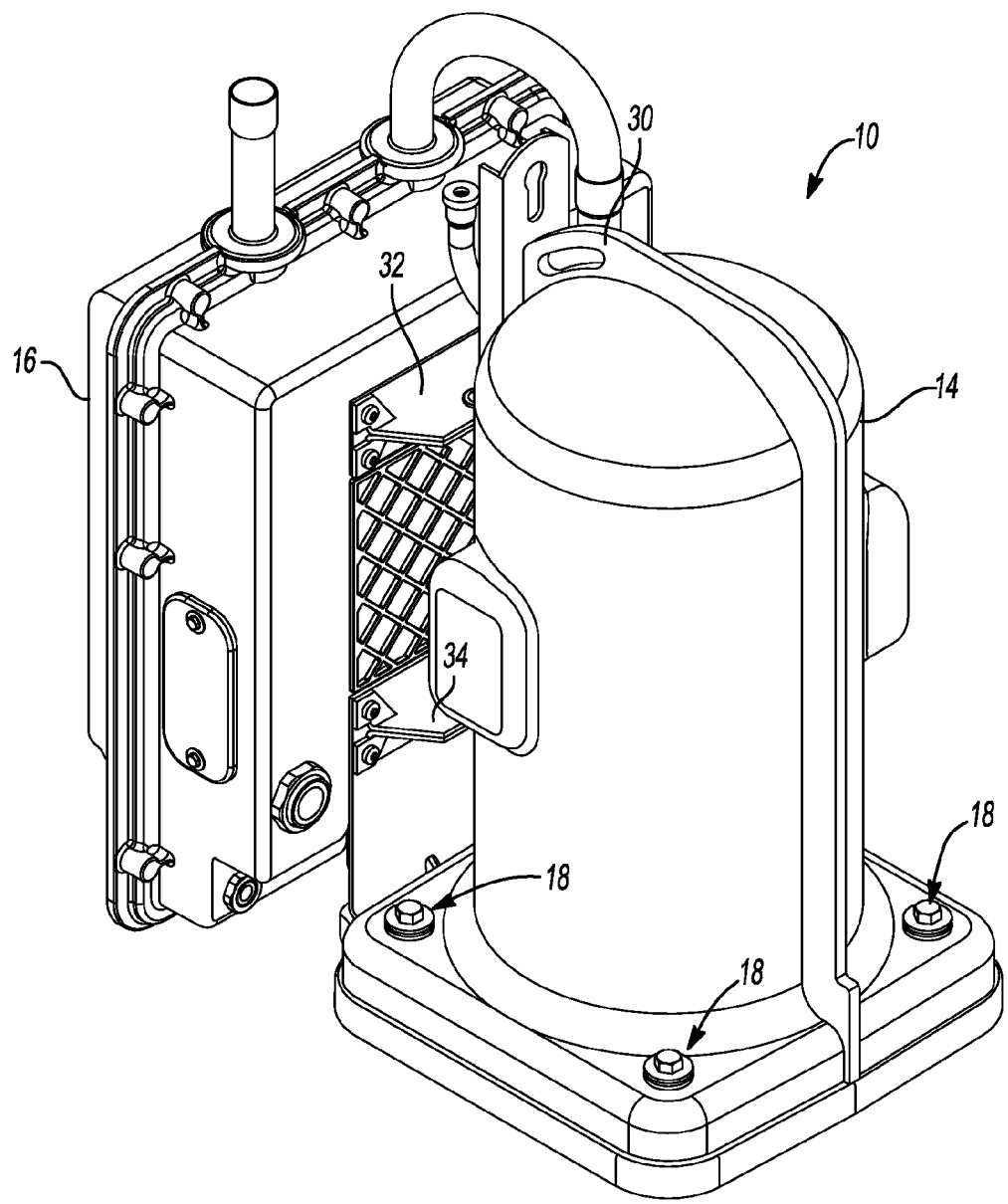
FIG. 1 is a perspective view of a compressor assembly according to the present disclosure.
Figure 2:
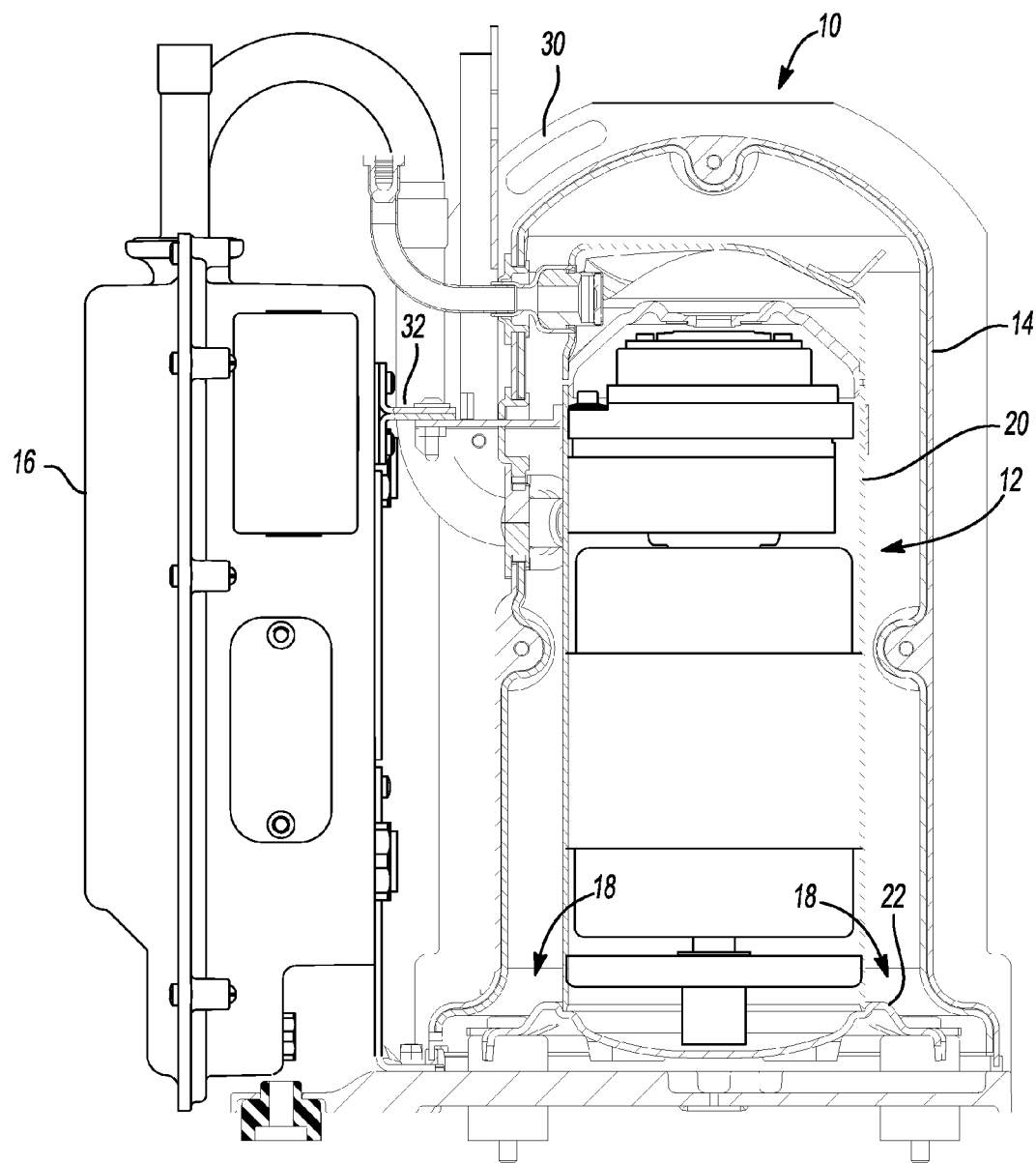
FIG. 2 is a fragmentary section view of the compressor assembly of FIG. 1.

With reference to FIGS. 1 and 2, a compressor assembly 10 may include a compressor 12 housed within a sound enclosure 14, an electric inverter drive system (not shown) housed within a drive enclosure 16, and a mounting assembly 18. The compressor 12 may include a shell 20 having a lower cover 22. The lower cover 22 may include an aperture 24 (FIGS. 4 and 5) for receiving mounting assembly 18.

Sound enclosure 14 may form an outer housing for compressor 12 to attenuate noise and vibrations generated by the compressor 12 during operation. With additional reference to FIGS. 4 and 5, sound enclosure 14 may include an outer portion 26 extending radially outwardly above lower cover 22 and including an aperture 28 concentrically aligned with the aperture 24 in lower cover 22. The outer portion 26 may include a lower region surrounding the perimeter of lower cover 22 and including a recess 29 extending into an inner surface thereof. Sound enclosure 14 may additionally include a handle 30 at an upper portion for transport of compressor assembly 10.

Figure 3:
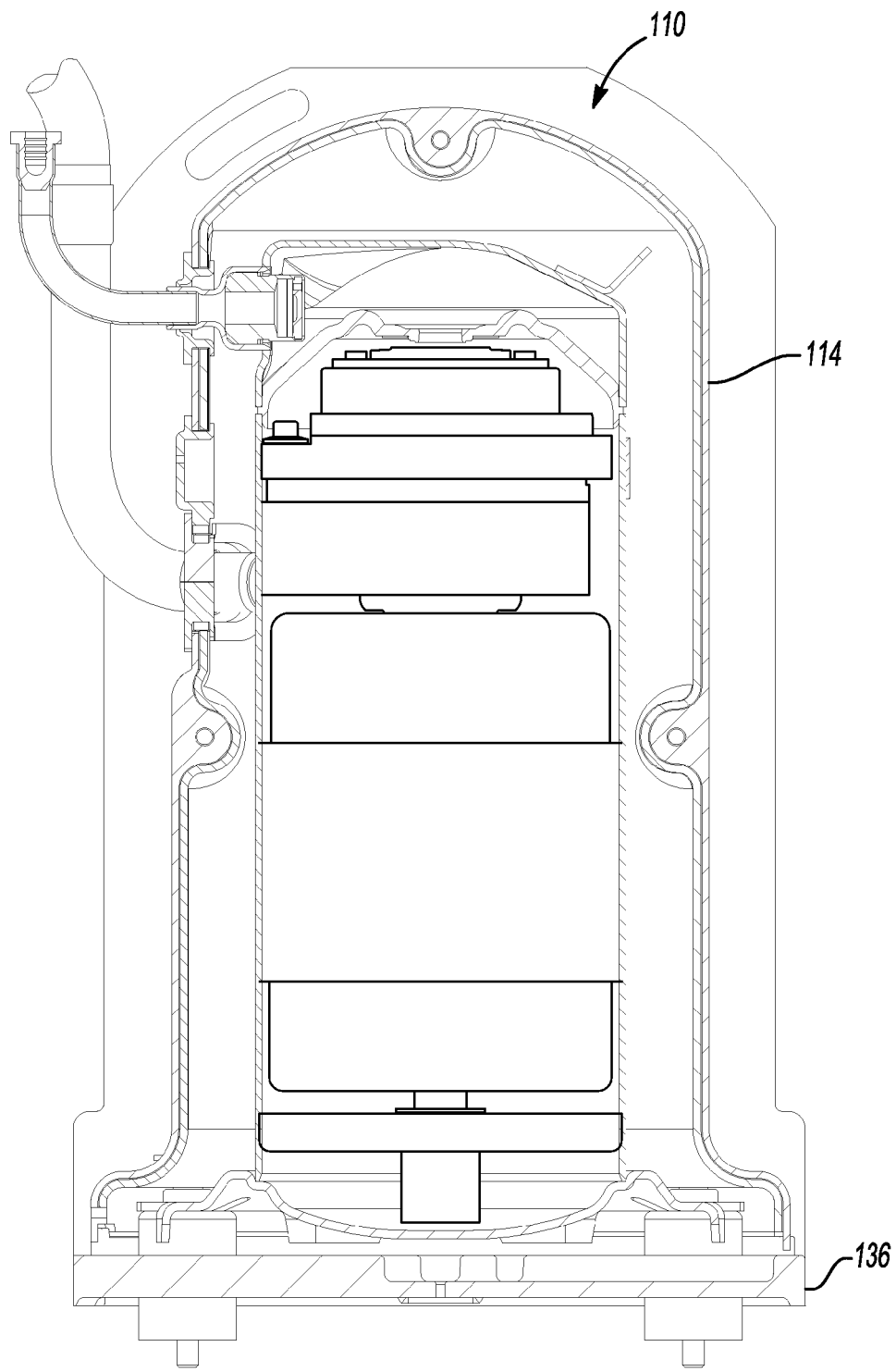
FIG. 3 is a fragmentary section view of an alternate compressor assembly according to the present disclosure.

Drive enclosure 16 may include first and second brackets 32, 34 secured to upper and medial portions of compressor 12 and a base 36 to support the compressor 12 and the drive enclosure 16. In an alternate arrangement, seen in FIG. 3, a compressor assembly 110 may include the base 136 as part of the sound enclosure 114. For simplicity, it is understood that the following description applies equally to both the compressor assembly 10 and the compressor assembly 110.

Base 36 may extend below lower cover 22, locating lower cover 22 axially between outer portion 26 and base 36. Base 36 may include a mounting region 38 defining an aperture 40 surrounded by first and second annular stepped regions 41, 42. The first stepped region 41 may form a first seating surface 44 and the second stepped region 42 may form a second seating surface 46. Base 36 may additionally include a radially outward extending lip 47 located within the recess 29 in sound enclosure 14.

Mounting assembly 18 may include a fastener 48 and first, second, and third isolation members 50, 52, 54. Isolation members 50, 52 and 54 may be formed from a flexible material such as an elastomer. By way of non-limiting example, first, second and third isolation members 50, 52 and 54 may include grommets and may be formed from a material including ethylene propylene diene monomer (EPDM), neoprene, or any other suitable grommet material. Fastener 48 may include a head 56 having a shank 58 extending therefrom. Shank 58 may include first and second radial protrusions 60, 62 axially spaced from one another and a threaded region 63 at an end of shank 58 generally opposite head 56.

First isolation member 50 may be located within aperture 28 of sound enclosure 14. First isolation member 50 may include a first portion 64 extending axially within aperture 28 and a second portion 66 extending radially from first portion 64. Second portion 66 may extend radially outward relative to first portion 64 and may be located axially between head 56 and outer portion 26 of sound enclosure 14.

Second isolation member 52 may include first and second portions 68, 70. First portion 68 may have an outer diameter less than an outer diameter of second portion 70 forming a stepped region defining a seating surface 71. First portion 68 may be located within aperture 24 of lower cover 22. Lower cover 22 may additionally abut seating surface 71. Second portion 70 may abut first seating surface 44 of base 36. Second isolation member 52 may additionally include a bore 72 receiving shank 58. Bore 72 may include first and second portions 74, 76. First portion 74 may have a diameter less than a diameter of first protrusion 60 and second portion 76 may have a diameter greater than the diameter of first protrusion 60.

Third isolation member 54 may also include first and second portions 78, 80. First portion 78 may have an outer diameter less than an outer diameter of second portion 80 forming a stepped region defining a seating surface 81. First portion 78 may be located within aperture 40 of base 36. Second portion 80 may abut second seating surface 46 of base 36. More specifically, seating surface 81 of third isolation member 54 may abut second seating surface 46 of base 36. Third isolation member 54 may additionally include a bore 82 receiving shank 58. Bore 82 may include first and second portions 84, 86. First portion 84 may have an inner diameter less than the diameter of second protrusion 62 and second portion 86 may have an inner diameter greater than the diameter of second protrusion 62.

Figure 4:
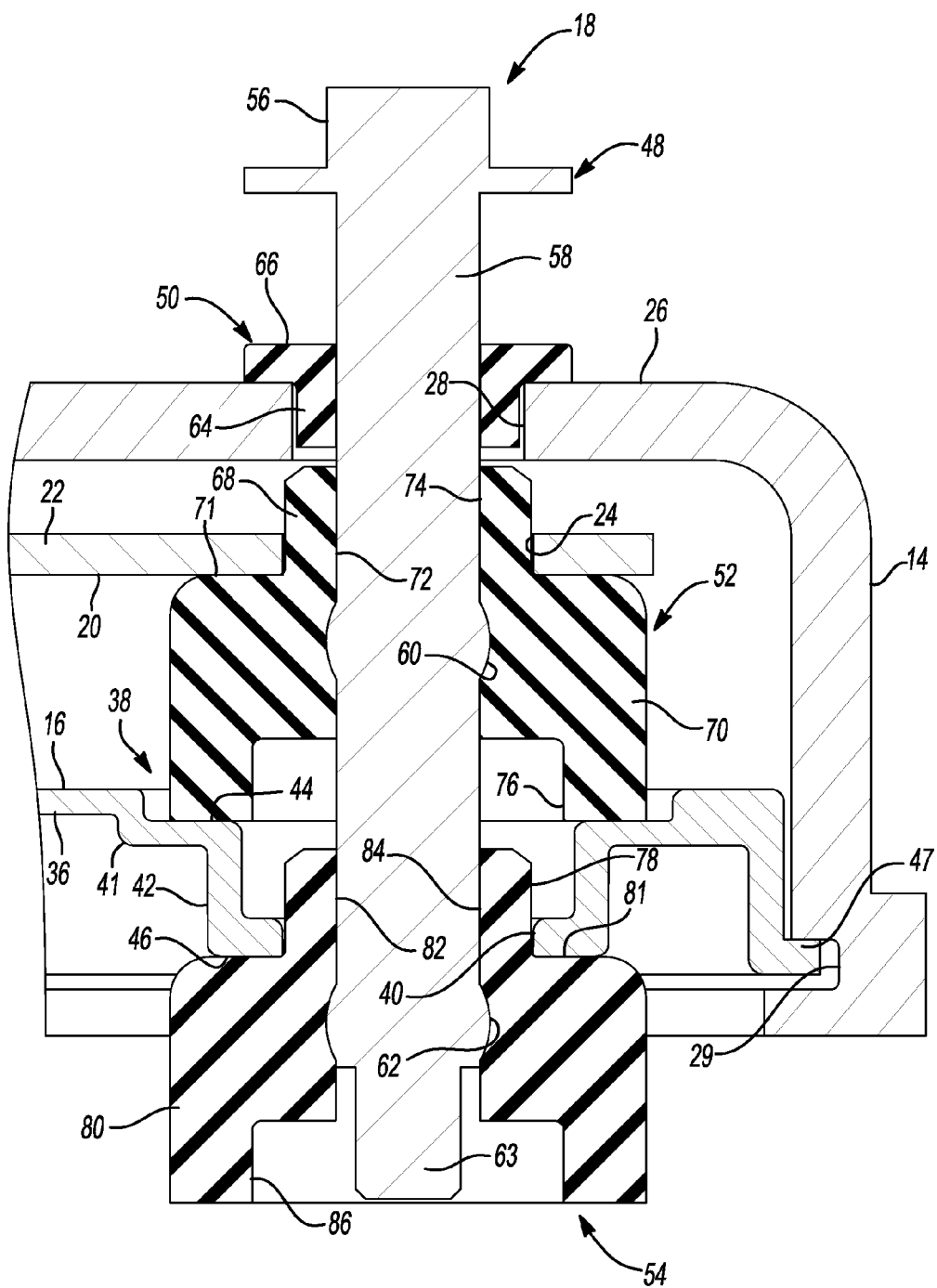
FIG. 4 is a schematic fragmentary section view of the compressor assembly of FIG. 1 in a first state of assembly.

In a transport state, shown in FIG. 4, first protrusion 60 may be located within first portion 74 of bore 72 in second isolation member 52 and second protrusion 62 may be located within first portion 84 of bore 82 in third isolation member 54. As discussed above, second and third isolation members 52, 54 may each be formed from a flexible material such as an elastomer. When in the transport state, first protrusion 60 may be frictionally engaged with second isolation member 52 and second protrusion 62 may be frictionally engaged with third isolation member 54 through an interference fit engagement, securing compressor assembly 10 for shipment. The engagement between the lip 47 of the base 36 and the recess 29 of the sound enclosure 14 may further secure the compressor assembly for shipment. Additionally, when in the transport state, threaded region 63 of shank 58 may be located within second portion 86 of bore 82, protecting threaded region 63 during transport.

Figure 5:
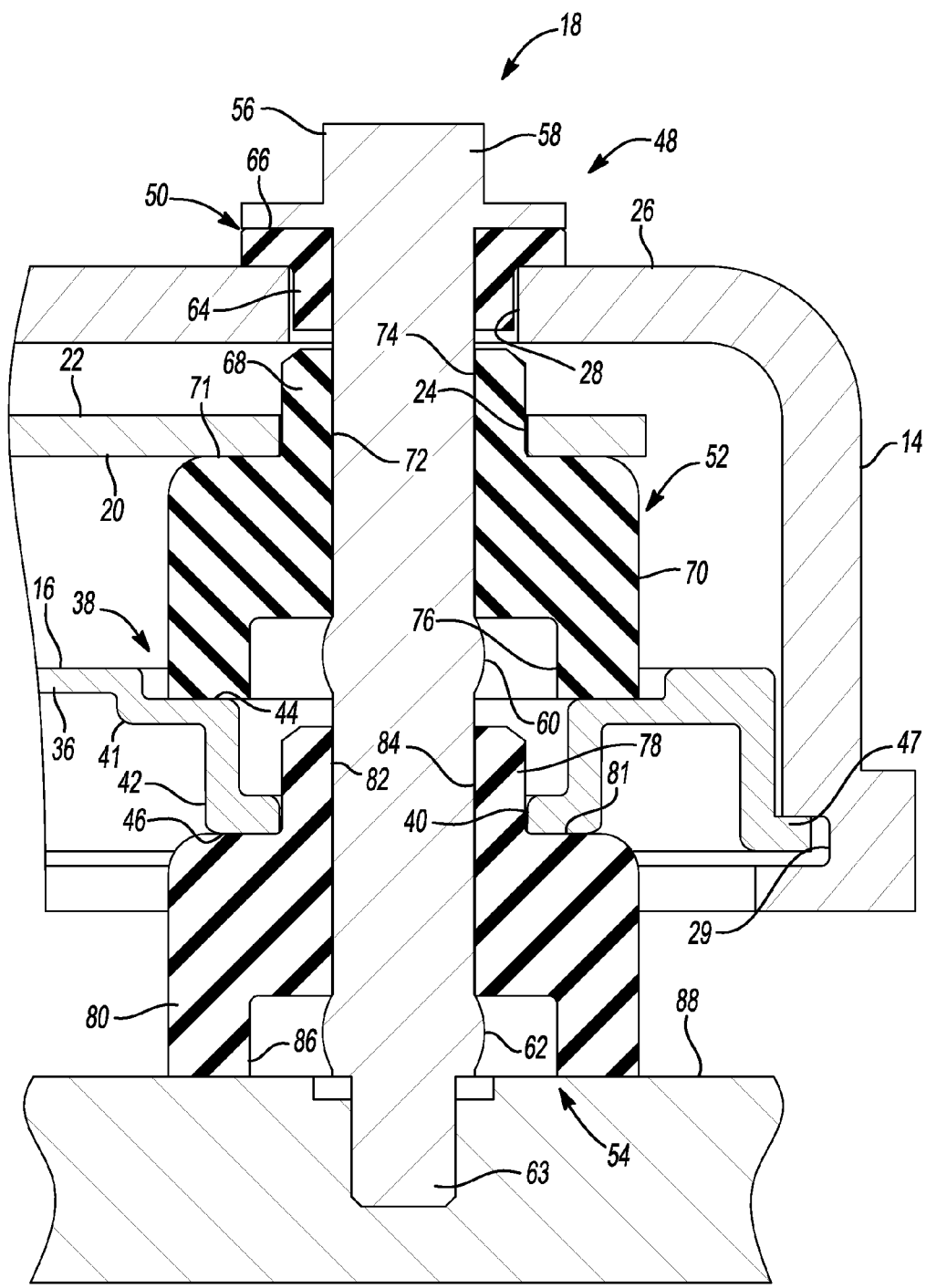
FIG. 5 is a schematic fragmentary section view of the compressor assembly of FIG. 1 in a second state of assembly.

In an assembled state, shown in FIG. 5, fastener 48 may be advanced axially in a direction from first portions 68, 78 of second and third isolation members 52, 54 toward second portions 70, 80. The sound enclosure 14 may remain secured to the base 36 after assembly due to the engagement between the lip 47 of the base 36 and the recess 29 of the sound enclosure 14. In the assembled state, first protrusion 60 may be located within second portion 76 of bore 72 and out of the frictional engagement with second isolation member 52. Second protrusion 62 may be located within second portion 86 of bore 82 and out of the frictional engagement with third isolation member 54. Threaded region 63 may be engaged with a mounting structure 88, securing the compressor assembly 10 thereto.

The terms "first", "second", etc. are used throughout the description for clarity only and are not intended to limit similar terms in the claims.

What is claimed is:

1. A compressor assembly comprising:
   a hermetic shell including a lower cover defining a first aperture;
   a compression mechanism supported within said shell;
   a base defining a second aperture; and
   a mounting assembly including:
      a first isolation member defining a third aperture and located on a first side of said base, said third aperture having a first portion defining a first inner diameter in a free state; and
      a fastener extending through said first, second, and third apertures, said fastener including a shank having a first radial protrusion defining a first outer diameter greater than the first inner diameter, said first radial protrusion being located longitudinally between at least a portion of said lower cover and at least a portion of said base.

2. The compressor assembly of claim 1, wherein said fastener is displaceable between first and second positions, said first radial protrusion being located in said first portion of said third aperture when in the first position and being axially spaced from said first portion of said third aperture when in the second position.

3. The compressor assembly of claim 2, wherein an end of said fastener is engaged with a mounting structure to secure the compressor assembly to the mounting structure when said fastener is in the second position, said end of said fastener being free from engagement with said mounting structure when said fastener is in the first position.

4. The compressor assembly of claim 3, wherein said fastener secures said lower cover and said base to one another when said fastener is in the first position.

5. A compressor assembly comprising:
   a hermetic shell including a lower cover defining a first aperture;
   a compression mechanism supported within said shell;
   a base defining a second aperture; and
   a mounting assembly including:
      a first isolation member defining a third aperture and located between said lower cover and a first side of said base, said third aperture having a first portion defining a first inner diameter;
      a second isolation member defining a fourth aperture and located adjacent a second side of said base opposite said first side, said fourth aperture having a first portion defining a second inner diameter; and
      a fastener extending through said first, second, third and fourth apertures, said fastener including a shank having first and second radial protrusions spaced from one another, said first radial protrusion defining a first outer diameter greater than the first inner diameter and said second radial protrusion defining a second outer diameter greater than the second inner diameter.

6. The compressor assembly of claim 5, wherein said fastener is displaceable between first and second positions, said first radial protrusion being located in said first portion of said third aperture when in the first position and being axially spaced from said first portion of said third aperture when in the second position.

7. The compressor assembly of claim 6, wherein an end of said fastener is engaged with a mounting structure to secure the compressor assembly to the mounting structure when said fastener is in the second position, said end of said fastener being free from engagement with said mounting structure when said fastener is in the first position.

8. The compressor assembly of claim 7, wherein said fastener secures said lower cover and said base to one another when said fastener is in the first position.

9. The compressor assembly of claim 6, wherein said second radial protrusion is located in said first portion of said fourth aperture when said fastener is in the first position and is axially spaced from said first portion of said fourth aperture when said fastener is in the second position.

10. The compressor assembly of claim 9, wherein said fourth aperture includes a second portion defining a third inner diameter greater than the second outer diameter.

11. The compressor assembly of claim 10, wherein said second isolation member extends axially beyond an end of said fastener when said fastener is in the first position.

12. The compressor assembly of claim 5, wherein said fastener couples said lower cover and base to one another before said compressor assembly is secured to a mounting structure.

13. The compressor assembly of claim 5, further comprising a sound attenuation cover coupled to said base.

14. The compressor assembly of claim 13, wherein said base forms a sound attenuation cover base.

15. The compressor assembly of claim 5, wherein said fastener includes a head at a first axial end of said shank, said first radial protrusion located axially between said head and a second axial end of said shank, said second radial protrusion located axially between said first radial protrusion and said second axial end, said lower cover secured axially between said head and said first radial protrusion and said base secured axially between said first and second radial protrusions.

16. The compressor assembly of claim 15, wherein said first isolation member abuts said lower cover and said second isolation member abuts said second side of said base.

17. The compressor assembly of claim 16, wherein said fastener is displaceable between first and second positions, said second axial end of said fastener securing the compressor assembly to a mounting structure when said fastener is in the second position, said second axial end of said fastener being free from engagement with said mounting structure when in the first position, said first radial protrusion axially securing said first isolation member on said shank and said second radial protrusion axially securing said second isolation member on said shank when said fastener is in the first position.

18. The compressor assembly of claim 17, wherein said first isolation member supports said lower cover on said fastener and said second isolation member supports said base on said fastener when said fastener is in said first position.

19. The compressor of claim 5, wherein said first and second isolation members are each formed from an elastomer.

20. The compressor of claim 1, wherein said first isolation member is formed from an elastomer.

* * * * *